United States Patent
See et al.

(10) Patent No.: US 9,298,393 B2
(45) Date of Patent: Mar. 29, 2016

(54) BUFFER MANAGEMENT FOR INCREASED WRITE SPEED IN LARGE SECTOR DATA STORAGE DEVICE

(75) Inventors: KokChoon See, Singapore (SG); Wesley Chan, Singapore (SG); CheeSeng Toh, Singapore (SG); PohGuat Bay, Singapore (SG); ChweeFern Ee, Tiong Bahru (SG); YongPeng Chng, Woodlands (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 1874 days.

(21) Appl. No.: 12/138,022

(22) Filed: Jun. 12, 2008

(65) Prior Publication Data
US 2009/0313426 A1  Dec. 17, 2009

(51) Int. Cl.
*G06F 3/06* (2006.01)
*G06F 12/08* (2006.01)

(52) U.S. Cl.
CPC ............ *G06F 3/0661* (2013.01); *G06F 3/0613* (2013.01); *G06F 3/0656* (2013.01); *G06F 3/0676* (2013.01); *G06F 12/0868* (2013.01)

(58) Field of Classification Search
CPC ... G06F 3/0661; G06F 3/0676; G06F 3/0613; G06F 3/0656; G06F 12/0868
USPC ...................... 711/112, 135, E12.002; 710/52
See application file for complete search history.

(56) References Cited

U.S. PATENT DOCUMENTS

| | | | |
|---|---|---|---|
| 5,224,214 A * | 6/1993 | Rosich | 710/39 |
| 5,594,926 A * | 1/1997 | Chang et al. | 710/52 |
| 5,870,625 A | 2/1999 | Chan et al. | |
| 6,832,288 B2 | 12/2004 | Ohta et al. | |
| 7,058,760 B2 | 6/2006 | Ohta et al. | |
| 7,310,707 B2 | 12/2007 | Olds et al. | |
| 2004/0024971 A1 | 2/2004 | Bogin et al. | |
| 2006/0090044 A1* | 4/2006 | Hillier et al. | 711/155 |
| 2008/0133839 A1* | 6/2008 | Schmidt et al. | 711/129 |
| 2009/0150614 A1* | 6/2009 | Auerbach et al. | 711/118 |

OTHER PUBLICATIONS

Stevens, Curtis E., "Implementation Guidelines for 1K/4K Sector Sizes," T13/e05122r3, Western Digital Technologies, Inc., (Aug. 19, 2005).

* cited by examiner

*Primary Examiner* — Edward Dudek, Jr.
(74) *Attorney, Agent, or Firm* — HolzerIPLaw, PC

(57) ABSTRACT

An intelligent write command routine improves the operational efficiency of a data storage device (DSD) by avoiding media access of the disk when a logical block address (LBA) and the physical sector are unaligned, thus reducing write time. When a write command is received by the DSD from the host, the intelligent write command routine maintains the read data of the read buffer, instead of clearing the read buffer and performing a read of the target sector on the disk per standard protocol. The intelligent write command copies the necessary adjacent sector data from the read buffer as a data patch to the write buffer to splice around the write data received with the write command. Following each write command, the data written to the disk in the write buffer is copied to the read buffer. The read buffer is maintained with the most current data on the disk and does not need to be flushed unless the LBA of the write command is beyond the data ranges stored in the read buffer.

18 Claims, 6 Drawing Sheets

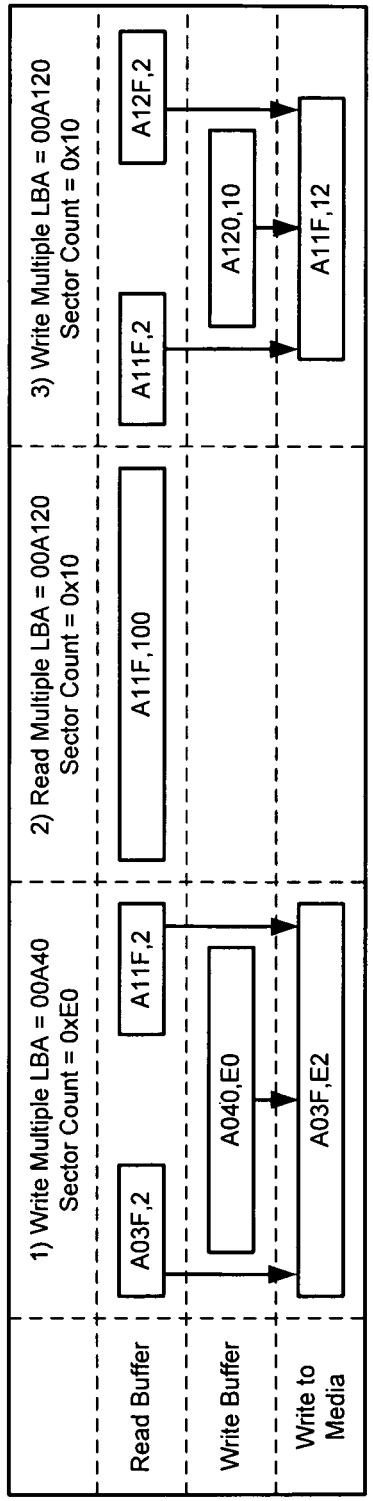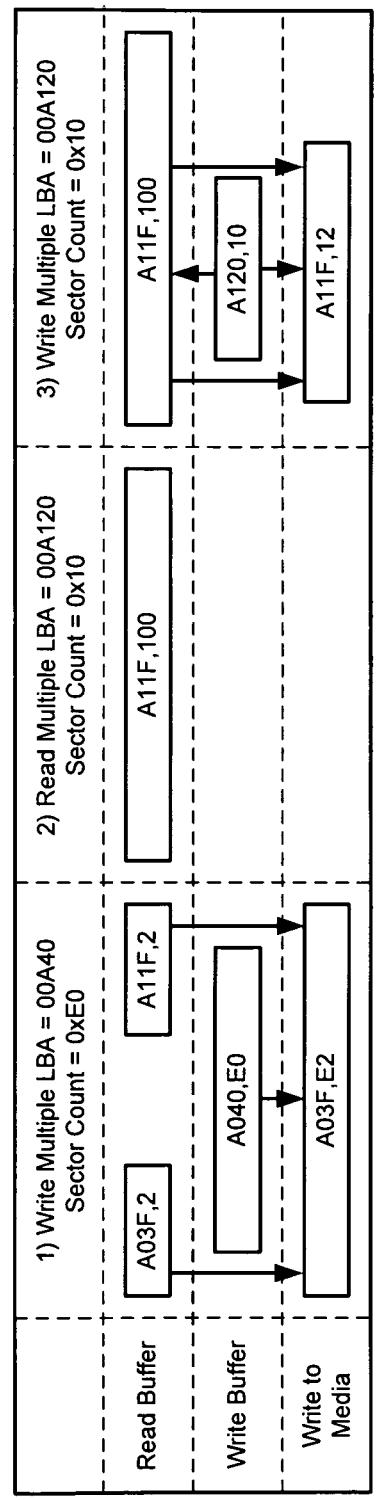
Fig. 6A
Fig. 6B

BUFFER MANAGEMENT FOR INCREASED WRITE SPEED IN LARGE SECTOR DATA STORAGE DEVICE

BACKGROUND

Data storage devices (DSD) store data and include a mechanical portion, or head-disk assembly (HDA) and an electronics portion, or printed circuit board wiring assembly (PWA), controlling functions of the HDA while providing a communication interface between the HDA and a host being serviced by the DSD. The HDA has a disk, with data recorded on a recording surface, rotated at a constant speed by a motor assembly, the data is accessed by a read/write head of an actuator assembly the position of which is controlled by a closed loop servo system. The data storage device market continues to place pressure on the industry for DSD's with higher rates of data throughput.

DSD standards have recently been revised to change the physical sectors on the drives from 512 bytes to 1024 bytes (or "1K"). While the Advanced Technology Attachment ("ATA") standard allows the local block address ("LBA") to be changed to conform to the physical sector size, changing the LBA from 512 bytes is not presently compatible with the basic input/output system ("BIOS"), operating system software, applications, host interface, drive interface, and hardware. These legacy operating systems, applications, and hardware still transmit and request data in 512 byte blocks. Some of the hardware is actually "hard wired" to read and write in 512 bytes and cannot be changed via a firmware update.

Even though the physical sector size on a hard disk drive may be 1K, it will still have to manage data transfer requests, file allocation tables ("FAT"), and drive partitioning based upon 512 byte formats. For optimal performance, data transfers should start on even LBAs and end on odd LBAs as even LBAs are aligned with the beginning of each 1K physical sector. This means that for operating systems and hardware limited to 512 byte functionality, the beginning of each odd LBA is unaligned with a physical sector and must be located using a read command before the remaining data can be written. This degrades the DSD writing time and thus the performance of the DSD in time-critical applications.

The information included in this Background section of the specification, including any references cited herein and any description or discussion thereof, is included for technical reference purposes only and is not to be regarded subject matter by which the scope of the invention is to be bound.

SUMMARY

An intelligent write command routine improves the operational efficiency of a DSD by avoiding media access of the disk when an LBA and the physical sector are unaligned, thus reducing write time. In one implementation, when a write command is received by the DSD from the host, the intelligent write command routine maintains the read data of the read buffer, instead of clearing the read buffer and performing a read of the target sector on the disk per standard protocol. The intelligent write command copies the necessary adjacent sector data from the read buffer as a data patch to the write buffer to splice around the write data received with the write command. Furthermore, following each write command, the data written to the disk in the write buffer is copied to the read buffer. In this manner, the read buffer is maintained with the most current data on the disk and does not need to be flushed unless the LBA of the write command is beyond the data ranges stored in the read buffer. Further, if read look-ahead is active during read commands, a large amount of data may be available in the read buffer for use in patching 512 byte write commands to 1 K sectors and thus significantly reduces the write time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the present invention will be apparent from the following more particular written description of various embodiments of the invention as further illustrated in the accompanying drawings and defined in the appended claims.

BRIEF DESCRIPTION OF THE DRAWINGS

FIG. 6A is a schematic diagram indicating the content of an exemplary read/write buffer performing write and read requests according to the known scheme depicted in FIG. 4.

FIG. 6B is a schematic diagram indicating the content of an exemplary read/write buffer performing a write and read requests according to the implementation of the intelligent write command depicted in FIG. 5.

DETAILED DESCRIPTION

Figure 1:
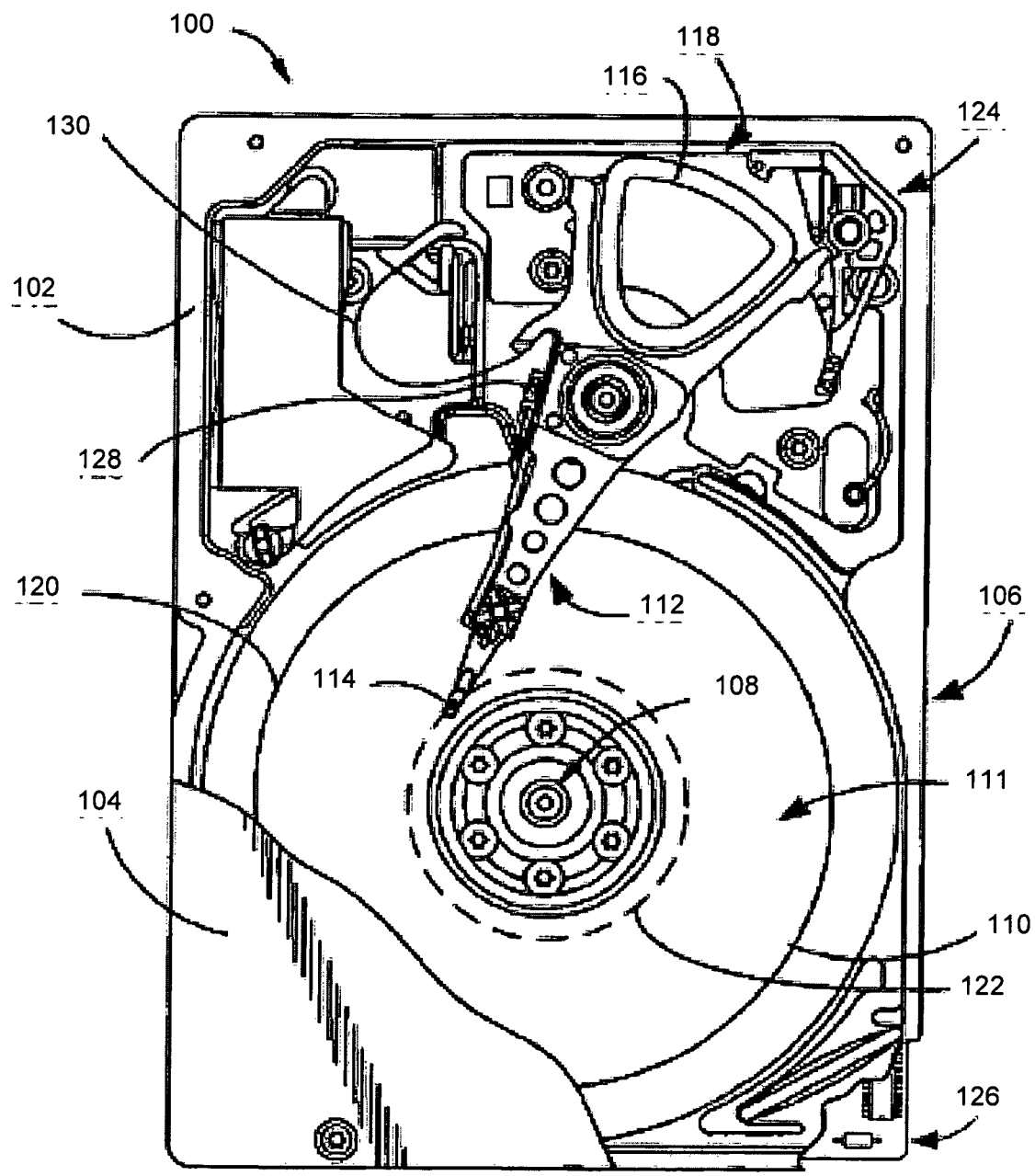
FIG. 1 is a top plan view with various cut-away areas of a typical hard disk drive data storage device.

Referring now to the drawings, FIG. 1 provides a top plan view of a data storage device 100 (also referred to as DSD 100). The DSD 100 includes a rigid base deck 102 cooperating with a top cover 104 (shown in partial cutaway) to form a sealed housing for a mechanical portion of the DSD 100, typically referred to as a head-disk assembly 106. A spindle motor assembly 108 (also referred to as motor 108) rotates a number of data storage disks 110 with a magnetic recording surface 111 (also referred to as storage media 111) at a substantially constant speed. A rotary actuator 112 (also referred to as actuator 112) supports and rotates a number of read/write heads 114 adjacent the storage media 111 when current is applied to a coil 116 of a voice coil motor (VCM) 118.

During operation of the DSD 100, the actuator 112 moves the heads 114 to information data tracks 120 of the storage media 111 to write data to and read data from the disk 110. When the DSD 100 is deactivated, the actuator 112 positions the heads 114 adjacent a home position 122 and the actuator 112 is confined by latching a toggle latch 124.

Command, control, and interface electronics for the DSD 100, are provided on a printed circuit board assembly 126 mounted to the head-disk assembly 106. Operational control of the data storage device is provided by firmware executed by a micro-processor controller (not separately shown) of the printed circuit board assembly 126. During data transfer operations, a preamplifier/driver (preamp) 128 attached to a flex circuit 130, conditions read/write signals conducted by the flex circuit 130 between the printed circuit board assembly 126 and the read/write head 114.

Figure 2:
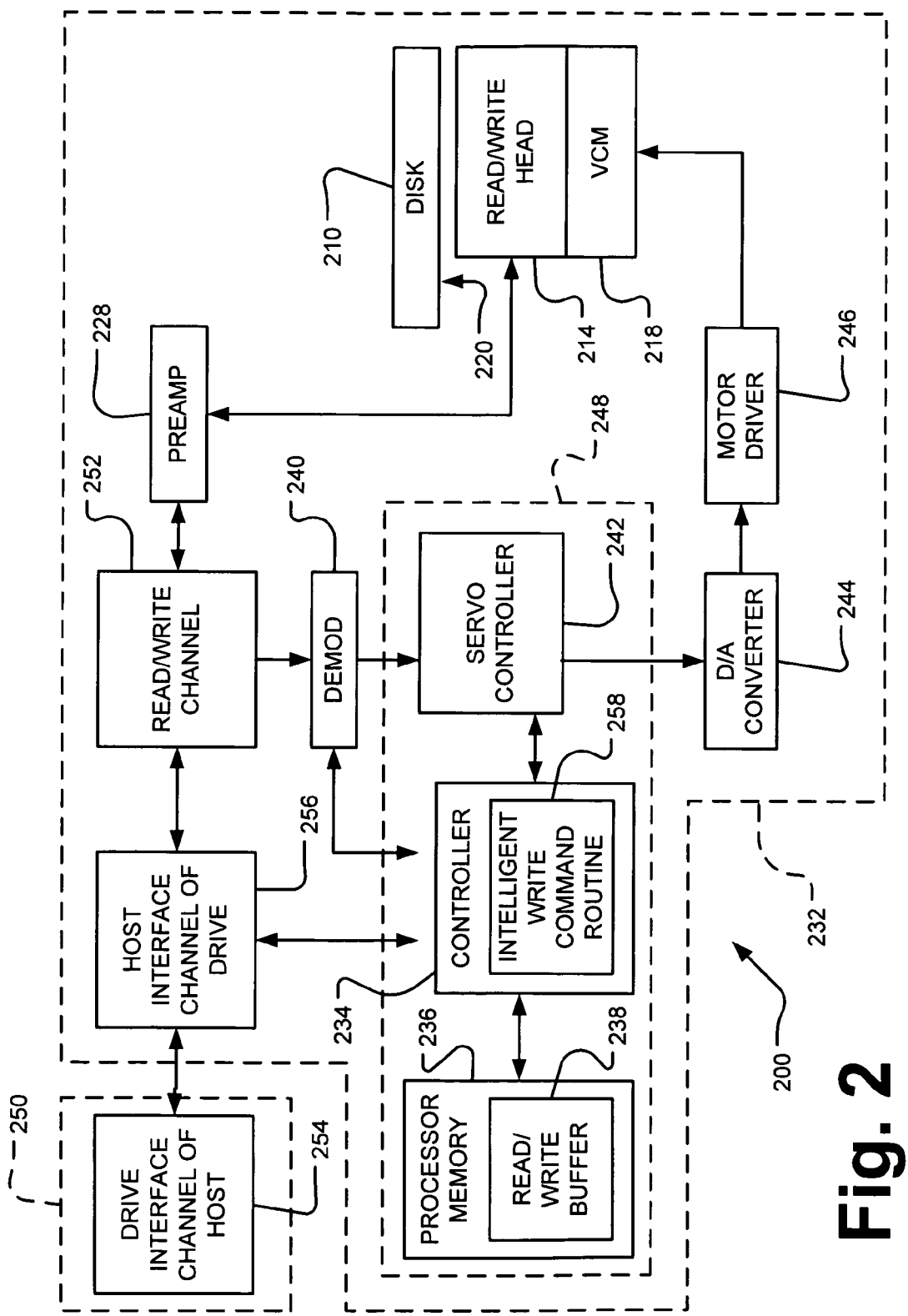
FIG. 2 is a schematic diagram of an implementation of functional components of the data storage device of FIG. 1 including an intelligent write command routine in the controller.

Turning to FIG. 2, a schematic diagram of functional components of the DSD 200 are shown. Position-control of the read/write head 214 is provided by the positioning mechanism (not separately shown) operating under the control of a servo control circuit 232 programmed with servo control code, which forms a servo control loop. The servo control circuit 232 includes a micro-processor controller 234 (also referred to herein as controller 234), a memory 236, a read/write buffer 238, a demodulator 240, an application specific integrated circuit (ASIC), hardware-based, servo controller ("servo engine") 242, a digital-to-analog converter (DAC) 244, and a motor driver circuit 246. Optionally, the controller 234, the random access memory 236, and the servo engine 242 are portions of an application specific integrated circuit 248. The components of the servo control circuit 232 are utilized to facilitate track following algorithms for the actuator (112 of FIG. 1) and more specifically for controlling the voice coil motor (118 of FIG. 1) in position-controlling the read/write head 214 relative to the selected information track 220.

A portion of the random access memory 236 is used as a cache 237 that may be divided into a read buffer 238 for storage of data read from the information track 220 awaiting transfer to a host 250 connected to the DSD 200 and a write buffer 239 which is used for write-back storage of data transferred from the host 250 to the DSD 200 to be written to the information track 220. The information track 120 is divided into a plurality of data-sectors of fixed length, for example, 512 bytes, 1024 bytes (1K), or 4096 bytes (4K).

In addition to the servo control code, the control code is also programmed into the application specific integrated circuit 248 for use in executing and controlling data transfer functions between the host 250 and the DSD 200. Data received from the host 250 via a drive interface channel 254 is placed in the read/write buffer 238 for transfer to the disk 210 by read/write channel electronics 252, which operates under control of the controller 234. Read data requested by the host 250 not found in read/write buffer 238 is read by the read/write head 214 from the information track 220, and then processed by the read/write channel electronics 252 and stored in the read buffer 238 for subsequent transfer to the host 250 via a host interface channel 256 of the DSD 200.

Similarly, the cache 237 portion of the random access memory 236 is sectioned into a plurality of data blocks of either fixed length, sometimes referred to as segments, or variable length, sometimes referred to as fragments. Each fixed length data block is substantially sized to accommodate one of the plurality of fixed length data-sectors of the information track 220. For example, under a buffer memory or cache management scheme, the plurality of data blocks are grouped into a plurality of fixed length memory segments within an 8 MB read/write buffer.

As the cache 237 is needed to store data read from the disk 210, segments are assigned via pointers in the control code. Once a segment has been assigned, that portion of the cache 237 is consumed in its entirety. The cache 237 is also used for storing commands associated with an execution queue, as well as for storage of various operational needs of the DSD 200 as discussed further herein below.

Because allocation of the amount of the memory 236 dedicated to cache 237 is limited, effective utilization of the read buffer 238 and write buffer 239 is important to the overall operating performance of the DSD 200. To maximize the effective utilization of the cache 237, non-requested data (i.e., speculative data—data having a future probability of being requested by the host 250) in addition to host data (i.e., the data requested by the host 250) is frequently retrieved from the disk 210 during a seek operation and placed in the cache 237. The speculative data portion may include data preceding the actual host-requested data portion (read on arrival data) and data subsequent to the host-requested data portion (read look-ahead data).

Speculative data is gathered and stored in the read buffer 238 in an attempt to avoid a future mechanical seek to the disk 210 for data requested by the host 250. By satisfying a request for data from the host 250 out of the read 238, use of the mechanical components of the DSD 200 is avoided, thereby increasing data transfer performance by the DSD 200. However, pursuant to standard protocols, all data including speculative data is flushed from the read buffer 238 upon receipt of a write command. This is so because the data in the read buffer 238, or at least portions thereof, may likely be obsolete once the write command to the disk is complete.

In order to minimize the write time of the DSD 200 for servicing a request to write data by the host 250, the technology disclosed herein introduces an intelligent write command routine 258. The intelligent write command routine 258 improves the operational efficiency of the DSD 200 by avoiding media access of the disk 210 when an LBA and the physical sector are unaligned, thus reducing write time. In one implementation, when a write command is received by the DSD 200 from the host 250, instead of clearing the read buffer 238 and performing a read of the target sector on the disk 210 per standard protocol, the intelligent write command routine 258 maintains the read data of the read buffer 238 and reads the adjacent sector data from the read buffer 238 to copy as a data patch to the write buffer 239 to splice around the write data received with the write command. Furthermore, following each write command, the data written to the disk 210 in the write buffer 239 is copied to the read buffer 238. In this manner, the read buffer 238 is maintained with the most current data on the disk 210 and does not need to be flushed unless the LBA of the write command is beyond the ranges stored in the read buffer 238. Further, if read look-ahead is active during read commands, a large amount of data may be available in the read buffer 238 for use in patching 512 byte write commands to 1K sectors and thus significantly reduces the write time.

Figure 3A:
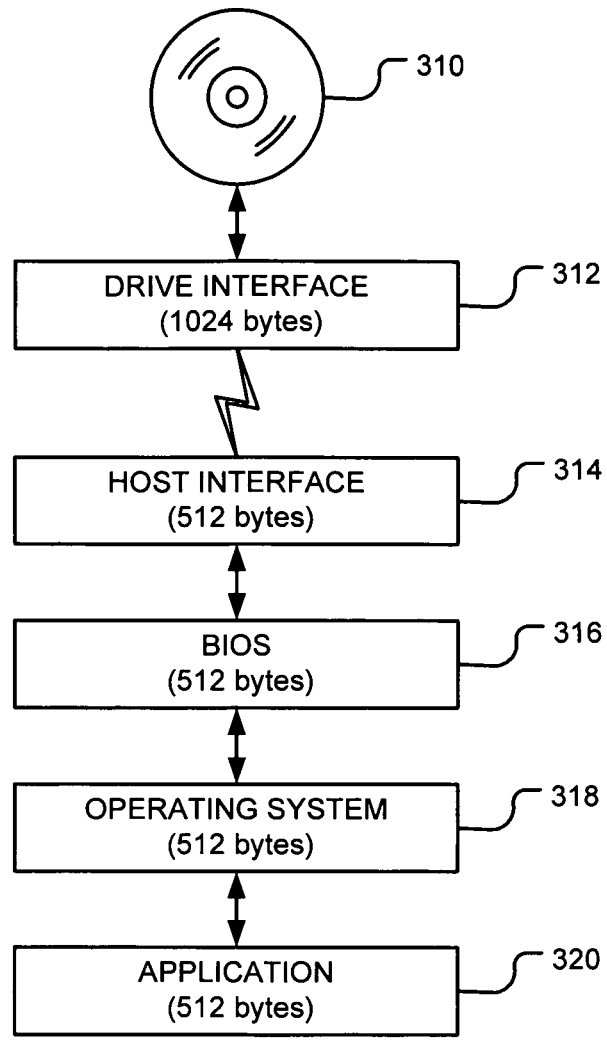
FIG. 3A is a schematic diagram of various components of a computer system that may be configured to request or provide lower byte count data blocks than the sector format of the data storage device.

FIG. 3A depicts simply the problem between efficiently implementing the new 1K sector standard with legacy systems and software. The disk media 310 is physically formatted into 1024 byte (1K) sectors. The drive interface 312 is similarly implemented to request 1K writes and process and return 1K reads. However, one or more of the components of a host device or external requesting device, e.g., the host interface 314, the BIOS 316, the operating system 318, or an application 320 running on the host device or an externally connected computer may be unconfigurable and limited to transfer 512 bytes per read or write. Alternatively, although less likely if the disk is physically formatted to the 1K standard, the read/write buffers of the DSD may be hardware limited to 512 byte input/output capacity. If any of these components has a 512 byte limitation, any attempt by the DSD to implement a 1K write or read will return an error along the component chain and the read/write attempt will be a failure.

Figure 3B:
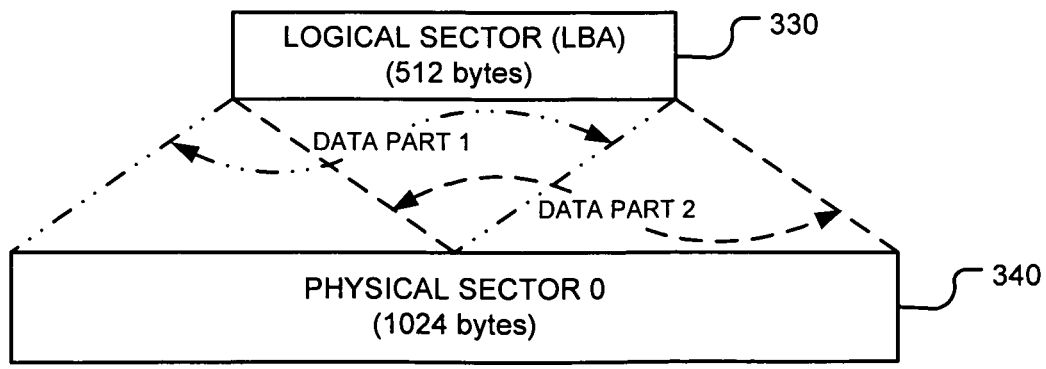
FIG. 3B is a schematic diagram of the difference between a logical sector size and a physical sector size.

The difference between a legacy LBA and the new 1K physical sector standard is represented in FIG. 3B. The logical sector 330 (i.e., the LBA) has a length of 512 bytes. However, the 1K physical sector 340 has a length of 1024 bytes. Therefore, data comprising up to two logical sectors 330 may be written within a single physical sector 340 under the 1K standard as indicated by the two sets of paired dashed lines between the logical sector 330 and the physical sector 340. But, because the DSD is configured to write to 1K sectors, it will request up to an additional 512 bytes from the read/write buffer to write to fill the physical sector 340. Since the start location for the second 512 byte batch of data is in the middle of the physical sector 340, the second half of the data write will be unaligned with the start of the physical sector 340 or any following physical sector. The result is that the DSD would have to perform a read command, e.g., a read-modify-write command, to locate the write start location in the middle of the physical sector 340, which costs an additional rotation of the disk while the write buffer is filling with the second 512 byte batch.

Figure 4:
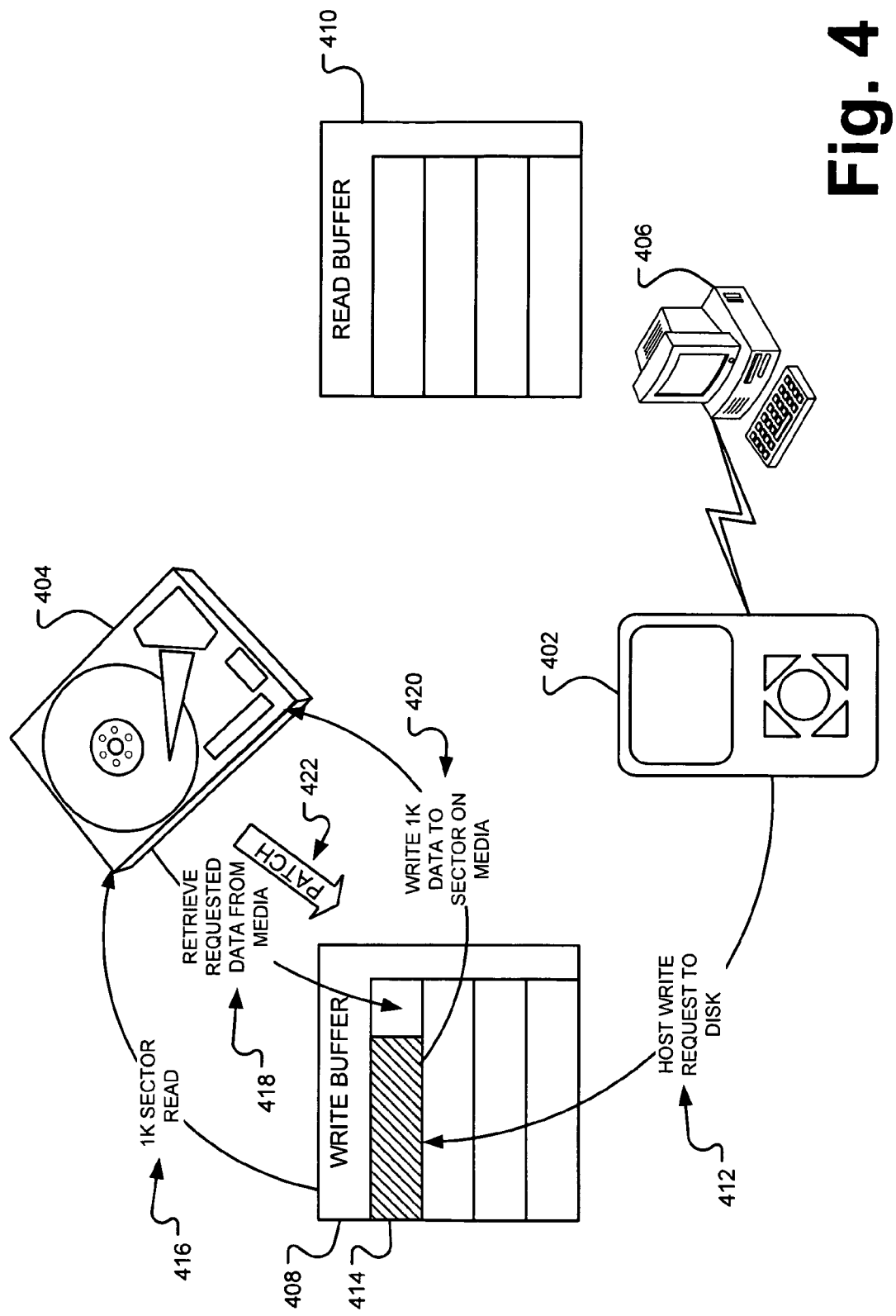
FIG. 4 is a schematic diagram depicting a known scheme for writing data blocks for smaller logical sectors to a data storage device formatted with larger physical sectors.

For purpose of comparison, a known methodology for implementing 512 byte read/write commands on a DSD physically formatted to the 1K standard is depicted in FIG. 4. The system includes a host device 402 (e.g., a digital audio player) housing a DSD 404 (e.g., a hard disk drive). The host 402 may alternatively be an independent computer system and the DSD 404 may alternatively be a standalone device external to the host 404. As shown in the embodiment of FIG. 4, the host 402 may further be connected with a computer system 406, which provides a source of music or other media or data files to the host 402. The DSD 404 further includes a cache with a write buffer 408 and a read buffer 410, which are important components in facilitating fast data read and write operations to the disk.

In order to transfer the data from the computer system 406 to the DSD 404 on the host 402, the host 402 initiates a write request 412. However, in this instance, the application or operating system software on the host 402 or on the computer system 406 is only able to format data in groups of 512 bytes, which are passed to the write buffer 408. Thus, the write buffer 408 contains an incomplete data set 414 to fill the 1K sector on the DSD 404. As an entire sector must be written with each write, a data patch 422 must be performed. A 1K sector read request 416 to the DSD 404 is made to locate the sector data surrounding requested write LBA for the data set 414, which is read into the write buffer 408. The retrieved splice data 418 is used to write the balance of data to fill the 1K physical sector. The write operation completes by writing a full 1K sector including the data set 414. Note that the patch operation 422 causes a delay in writing the data set 414 by requiring an additional read operation to the disk 504. While this delay may not seem significant in the individual case, performance issues become more significant as the frequency of write requests increase.

Figure 5:
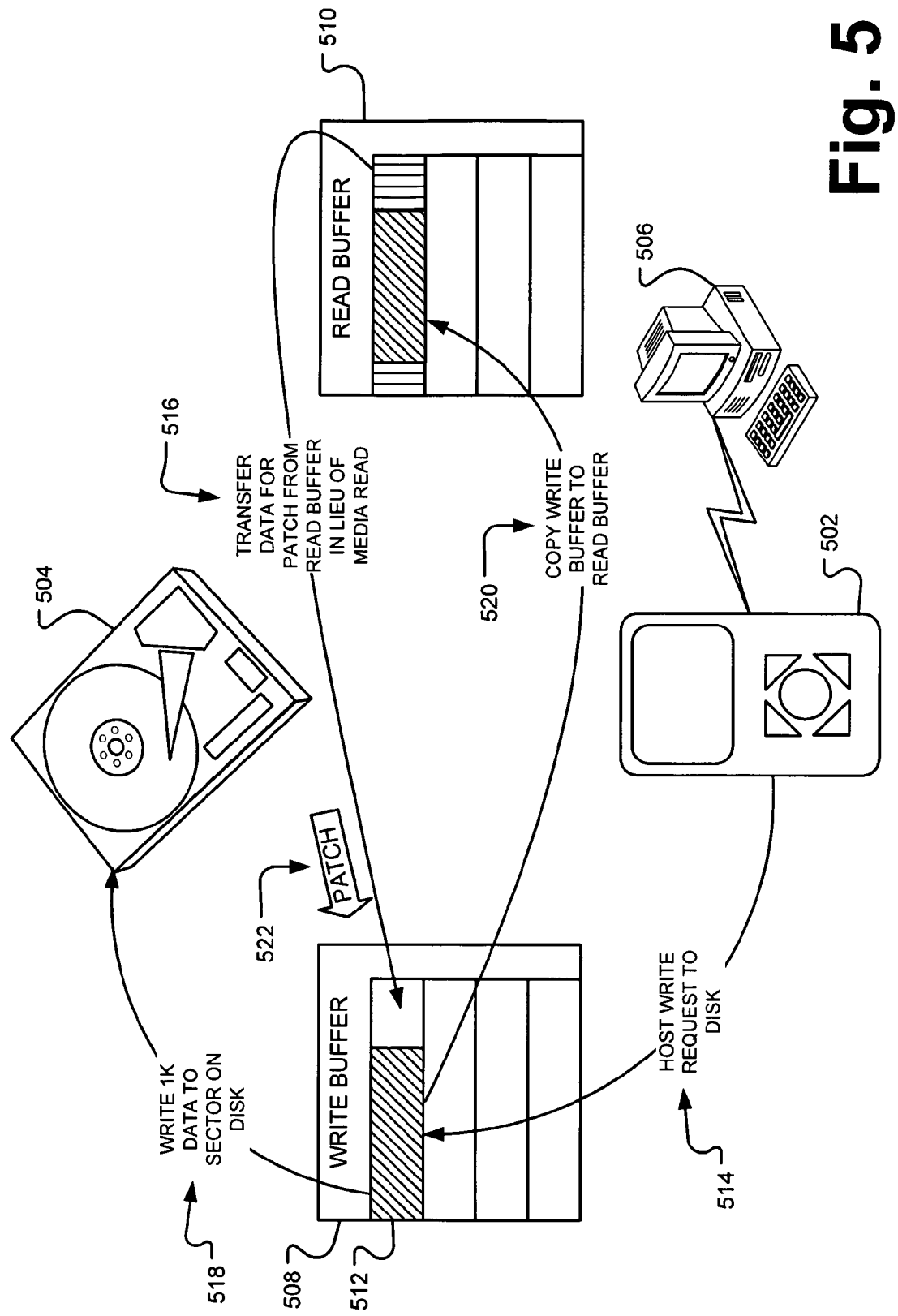
FIG. 5 is a schematic diagram of an implementation of an intelligent write command used to reduce the write time for writing data blocks for smaller logical sectors to a data storage device formatted with larger physical sectors.

In order to address this performance delay problem, the methodology depicted in FIG. 5 is proposed. The components of the environment are the same as in FIG. 4. The system includes a host device 502 (e.g., a digital audio player) housing a DSD 504 (e.g., a hard disk drive). The host 502 may alternatively be an independent computer system and the DSD 504 may alternatively be a standalone device external to the host 504. As shown in the embodiment of FIG. 5, the host 502 may further be connected with a computer system 506, which provides a source of music or other media or data files to the host 502. The DSD 504 further includes a write buffer 508 and a read buffer 510.

In FIG. 5 an intelligent write procedure is implemented in order to improve the performance delay normally encountered when writing 512 byte blocks to 1K sectors. In this implementation, the host 502 requests a write of a 512 byte data set 512 to the DSD 504. Thus, the write buffer 508 contains an incomplete data set 514 to fill the 1K sector on the DSD 504. As an entire sector must be written with each write, a data patch 522 must be performed. However, rather than making a normal read request to splice the sector data with the data set 514, the intelligent write command accesses the read buffer 510 to locate data within the sector write destination stored in the read buffer 510. The necessary data for splicing with the data set 512 is copied from the read buffer 510 to the write buffer 508 to complete the data patch 522 for a 1K sector write operation 518 without having to read from the DSD 504.

In order to implement this intelligent write command, data integrity must be ensured. In general, whenever a write command is received by the DSD 504, the read buffer 510 is flushed because the data stored thereon will be considered obsolete as soon as the write to disk is performed. However, the write buffer 508 still contains the most current data once the write command is complete. Therefore, the intelligent write command copies the data set 512 from the write buffer 508 to the read buffer 510 after the write to disk. This ensures that the read buffer 510 now has the most current data for the LBAs stored thereon and corresponding to sectors on the DSD 504. Use of the data in the read buffer 510 to perform a patch is significantly more efficient than performing a read command to identify the splice data. It should be noted that if a write command is received for sectors outside the ranges stored in the read buffer, the read buffer will have to be flushed and a sector read from the media will have to be performed in order to implement the patch.

Flushing the read buffer 510 when avoidable is a waste of resources, and is more so when the read look-ahead feature is active. The read look-ahead feature improves performance by reading sectors into the read buffer 510 before the sectors are actually requested by the host 502. A series of sequential reads of small blocks of data, rather than a single large block, can cause a performance loss of up to one revolution per command. The performance loss occurs when the controller is busy sending the next read command to the drive 504. During this interval, the next sectors to be read can spin past the head. If this occurs, reading the logical sector after the previously read sector requires an extra revolution of the disk. The read look-ahead feature improves performance by reading the logical sector after the previously read sector into the read buffer 508 for possible later use. When read look-ahead is used in conjunction with the intelligent write command, significant performance improvements in write speed are achieved.

FIG. 6A depicts the content of the read and write buffers corresponding to a series of writes and reads conducted under the known methodology of FIG. 4. As depicted in the first operational column for a write to multiple LBAs, when executing a write command with an LBA of 0xA040 and length 0xE0, which is less than a full 1K sector length, the disk needs to read back both LBA 0xA03F with length 2 and LBA 0xA11F with length 2 before writing the write buffer data to the disk. This is because the drive of the DSD is in 1K sectors with odd alignment, but the requested write data is within the boundary of an even LBA. Generally, an entire sector read is performed, but for the sake of illustration, only the sections of data needed for splicing with the data set in the write buffer are shown in the read buffer. The spliced sector patch write to LBA 0xA03F with length 0xE2 is then executed as indicated in the "write to media" row.

Next, in the second operational column a read command is performed across multiple LBAs indicated as 0xA120. Note that the read command is only for a length of 0x10, but read look-ahead has been implemented and an LBA of 0xA11F with a length of 0x100 is returned and stored in the read buffer.

Further, in the third operational column another write command is performed across multiple LBAs 0xA120, which is the same set of sectors subject to the prior read request. The start and end of the sector need to be spliced by performing a read operation. Even though the data in the read buffer from the prior read may be exactly what is needed to prepare a patch, in this case, the overlapping data between the read buffer and the write buffer will be invalidated in the read buffer as the data in the write buffer is considered the most current. Again, an entire sector read is performed, but for the sake of illustration, only the sections of data needed for splicing (0xA11F, 0x2 and 0xA12F, 0x2) with the data set in the write buffer are shown in the read buffer. Thus, all of the potentially useful information in the read buffer collected through a read look-ahead command is flushed. Any new read request will require a read from the disk. Further, the write command in operational column 3 was also required to perform a read from the disk even though the needed splice data was already in the read buffer from a prior read.

FIG. 6B depicts the content of the read and write buffers corresponding to a series of writes and reads conducted using the intelligent write command routine of FIG. 5. As depicted in the first operational column, an initial write to multiple LBAs with an LBA of 0xA040 and length 0xE0, which is less than a full 1K sector length, needs to read back both LBA 0xA03F with length 0x2 and LBA 0xA11F with length 0x2 before writing the write buffer data to the disk. This operation presumes an initially empty read buffer. Again, an entire sector read is performed, but for the sake of illustration, only the sections of data (0xA03F, 0x2 and 0xA11F, 0x2) needed for splicing with the data set in the write buffer are shown in the read buffer. The spliced sector patch write to LBA 0xA03F with length 0xE2 is then executed as indicated in the "write to media" row.

Next, in the second operational column a read command is performed across multiple LBAs indicated as 0xA120. Note that the read command is only for a length of 0x10, but read look-ahead has been implemented and an LBA of 0xA11F with a length of 0x100 is returned and stored in the read buffer.

Further, in the third operational column another write command is performed across multiple LBAs 0xA120, which is the same set of sectors subject to the prior read request. The start and end of the sector need to be spliced by performing a read operation. Normally, the overlapping data between the read buffer and the write buffer will be invalidated in the read buffer as the data in the write buffer is considered the most current. However, in this implementation the intelligent write command routine is performed. Rather than conducting an entire sector read, it is recognized that the data in the read buffer spans the sectors to be written in the present write operation, that there have been no intervening write operations, and thus the read data is current and can be used for a patch. The necessary splice data is copied from the read buffer as indicated in the third operational column to create the patch and the write to the media is performed as indicated in the bottom row. Thus, all of the potentially useful information in the read buffer collected through a read look-ahead command is maintained for use in future reads and writes. Additionally, to ensure that the data in the read buffer is current, the data set from the write buffer is copied into the read buffer and overwrites any old data in the buffer. The time taken to complete the operations depicted in FIG. 4 is shown in Table 1 below and totals 58.109 ms.

TABLE 1

| Operation Time | | |
| --- | --- | --- |
| Description | LBA/CHS | Timestamp |
| Cmd 0xC5 = Write Multiple | LBA = 00A040 Sctr Cnt = 0xE0 | 1.231 ms |
| Cmd 0xC4 = Read Multiple | LBA = 00A120 Sctr Cnt = 0x10 | 15.858 ms |
| Cmd 0xC5 = Write Multiple | LBA = 00A120 Sctr Cnt = 0x10 | 41.020 ms |

The time taken to complete the operations depicted in FIG. 5 is shown in Table 2 below and totals 19.683 ms, a significant improvement over Table 1 corresponding to FIG. 4.

TABLE 2

| Operation Time | | |
| --- | --- | --- |
| Description | LBA/CHS | Timestamp |
| Cmd 0xC5 = Write Multiple | LBA = 00A040 Sctr Cnt = 0xE0 | 1.091 ms |
| Cmd 0xC4 = Read Multiple | LBA = 00A120 Sctr Cnt = 0x10 | 15.494 ms |
| Cmd 0xC5 = Write Multiple | LBA = 00A120 Sctr Cnt = 0x10 | 4.098 ms |

Based upon the timing indicated above in Tables 1 and 2, the percentage improvement using the intelligent write command routine may be calculated. Initially we set $$Op_a = 58.109 \text{ ms and } Op_b = 19.683 \text{ ms}.$$

$$\psi = Op_b / Op_a$$
$$= 19.683/58.109$$
$$= 0.3387$$

Therefore, the percentage improvement using the intelligent write command routine is

=(1−0.3387)×100=66.13%, which is significant when considered in context with the frequency of unaligned write commands encountered when a 1K physical sector drive is paired with any system operating with legacy 512 byte read/write configurations.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products. In one implementation, a computer program product is provided as a computer-readable medium storing an encoded computer program executable by a computer system. Another implementation of a computer program product may be provided in a computer data signal embodied in a carrier wave by a computing system and encoding the computer program. Other implementations are also described and recited herein.

All directional references (e.g., proximal, distal, upper, lower, upward, downward, left, right, lateral, front, back, top, bottom, above, below, vertical, horizontal, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method comprising
maintaining a read data set in a read buffer of a data storage device upon receipt of a write command, wherein the read data set represents current data on the data storage device; and
performing a data patch on a write data set received from a host in a write buffer to write to a format sector larger than format sector of data used by the host using the read data set in the read buffer to provide splice data.

2. The method of claim 1 further comprising copying the write data set from the write buffer to the read buffer to ensure currency of the read data set.

3. The method of claim 1 further comprising writing the write data set with the data patch to a drive media in the data storage device.

4. The method of claim 3 further comprising copying the write data set from the write buffer to the read buffer to ensure currency of the read data set after the operation of writing the write data set with the data patch to a drive media is performed.

5. The method of claim 1 further comprising
performing a read look-ahead operation; and
storing results of the read look-ahead operation in the read buffer.

6. The method of claim 1 further comprising
performing a read operation; and
accessing results of the read operation from the read buffer instead of a drive media in the data storage device.

7. A data storage device comprising
a read buffer;
a write buffer; and
a controller configured to maintain a read data set in the read buffer upon receipt of a write command, wherein the read data set represents current data on the data storage device, and perform a data patch on a write data set received from a host in the write buffer to write to a format sector larger than format sector of data used by the host using the read data set in the read buffer to provide splice data.

8. The data storage device of claim 7, wherein the controller is further configured to copy the write data set from the write buffer to the read buffer to ensure currency of the read data set.

9. The data storage device of claim 7 further comprising
a drive media; and wherein
the controller is further configured to write the write data set with the data patch to the drive media.

10. The data storage device of claim 9, wherein the controller is further configured to copy the write data set from the write buffer to the read buffer to ensure currency of the read data set after the operation to write the write data set with the data patch to the drive media is performed.

11. The data storage device of claim 7, wherein the controller is further configured to perform a read look-ahead operation and store results of the read look-ahead operation in the read buffer.

12. The data storage device of claim 7, wherein the controller is further configured to perform a read operation and access results of the read operation from the read buffer instead of a drive media.

13. A method comprising
performing a data patch on a write data set received from a host in a write buffer of a data storage device to write to a format sector larger than format sector of data used by the host using a read data set in the read buffer to provide splice data, wherein the read data set represents current data in the read buffer of the data storage device at a time of receipt of a write command.

14. The method of claim 13 further comprising copying the write data set from the write buffer to the read buffer to ensure currency of the read data set.

15. The method of claim 13 further comprising writing the write data set with the data patch to a drive media in the data storage device.

16. The method of claim 15 further comprising copying the write data set from the write buffer to the read buffer to ensure currency of the read data set after the operation of writing the write data set with the data patch to a drive media is performed.

17. The method of claim 13 further comprising:
performing a read look-ahead operation; and
storing results of the read look-ahead operation in the read buffer.

18. The method of claim 13 further comprising:
performing a read operation; and
accessing results of the read operation from the read buffer instead of a drive media in the data storage device.

* * * * *